UNITED STATES PATENT OFFICE.

CHARLES WALRAND AND EUGENE LEGENISEL, OF PARIS, FRANCE.

PROCESS OF MANUFACTURING STEEL.

SPECIFICATION forming part of Reissued Letters Patent No. 11,570, dated September 29, 1896.

Original No. 503,816, dated August 22, 1893. Application for Reissue filed November 12, 1895. Serial No. 568,740. Patented in France June 29, 1891, No. 214,514; in England September 23, 1891, No. 16,178; in Belgium September 23, 1891, No. 96,499; in Germany September 24, 1891, No. 64,950, and in Austria-Hungary September 25, 1891, No. 16,542 and No. 35,534.

*To all whom it may concern:*

Be it known that we, CHARLES WALRAND and EUGENE LEGENISEL, citizens of the Republic of France, residing at Paris, France, have invented certain new and useful Improvements in Processes of Manufacturing Steel, (for which we have received Letters Patent in France, dated June 29, 1891, No. 214,514; in Germany, dated September 24, 1891, No. 64,950; in Austria-Hungary, dated September 25, 1891, No. 16,542 and No. 35,534; in England, dated September 23, 1891, No. 16,178, and in Belgium, dated September 23, 1891, No. 96,499,) of which the following is a full, clear, and exact description.

In conducting the manufacture of steel on a small scale a considerable percentage of the heat of the charge of metal in the converter is lost, and this is due to the early and too rapid combustion of the silicon, resulting in a solid product, silica. The heat developed in the bath is due to the combustion of the silicon. Thus, as in the process of dephosphorizing molten cast-iron, in which process the phosphorus is burned last, the silicon should be oxidized only after the elimination of the carbon, in order that the least possible amount of the heat may be carried away by the gases resulting from the combustion of the carbon. We have found in thus operating that there was a considerable gain in heat, which permitted the making of steel at a suitable temperature in small quantities.

The object of our process is to produce cast-steel with small charges, (say, approximately, one hundred kilograms,) thereby rendering the improvements substantially serviceable for making said metal on a limited scale.

Instead of using cast-iron containing a considerable proportion of silicon, we treat in the acid operation any cast-iron containing silicon, without regard to the degree of the latter, provided said cast-iron contains sufficient heat at the period when it is poured into the converting apparatus. We have found that with different qualities of cast-iron containing silicon in from 1.5 to three per cent, the final temperature of the bath resulting from the small charge which we employed varied very little, the brevity of the operation constituting an extremely important factor. If at the period when the oxidizing operation is terminated, (which in the converting apparatus is seen by the lowering of the flame,) a certain quantity of silicon is added to the bath under the form of any alloy and the blowing be continued, a remarkable phenomenon is produced. The flame disappears entirely, leading to the belief that the operation is only at the commencement of the blowing period; but it will be seen that the temperature gradually rises, and it is therefore the combustion of the silicon that heats the bath.

According to the proportions of silicon added, varying, of course, with the nature of the metal and the weight of the charge under treatment, the blowing is continued to the period when the flame of the carbon is seen to reappear. The said blow, which appeared cold, becomes extremely hot upon the addition of the silicon alloy. Generally the operation is terminated at this point, and to insure that the cast metal has reached a suitable condition a sample is taken. The metal is then cast as usual. The silicon alloy can be introduced either cold, at a red heat, or, preferably, in a molten condition to avoid any lowering of the temperature.

We do not limit ourselves to the use of silicon, but propose to use any other agent which, under the above specified conditions, will be capable of raising, by its combustion within the bath, the temperature thereof. Thus in a basic operation the bath would be liquefied after the blowing period by the addition of a rich alloy of phosphorus and by continuing to blow.

In conducting the manufacture of steel on a large scale by the Bessemer or the Thomas process the addition of silicon, phosphorus, or any other combustible agent, under the conditions specified above, could also be made with equally satisfactory results. It will be understood that the final addition of silicon as practiced by us has in nowise the purpose ordinarily in view of producing the deoxidation of the steel bath. In our process the object of the addition is to increase the temperature of the bath, thus enabling the employment of small charges and the production of steel on a limited scale and at a suitable temperature. As stated, the importance and effect of the addition varies with the size of the charge treated and the nature of the cast-iron under treatment. The addition of silicon or its equivalent could also be made a little while before or a little while after the flame drops, as the result obtained will be substantially the same, assuming the purpose of the addition, as before stated, being only to increase the temperature, so as to render the metal more fluid before casting. We do not contemplate merely augmenting the amount of silicon in the bath, as this can be secured either by mixing in crucibles or by cold or warm additions to the ladles into which the converting apparatus discharges. To secure the desired effect when operating with charges of two hundred kilograms, for example, it will be well to add, say, from five to ten per cent. of ferro-silicon containing ten per cent of silicon, which, however, does not avoid the necessity for the final deoxidizing addition.

We may employ an ordinary Bessemer converter having facilities for lower, upper, or lateral air-feed.

We claim—

The herein-described improvement in the manufacture of steel from metal originally containing silicon, which consists in treating the same to effect primary combustion and oxidation, adding silicon approximately at the period when the primary combustion is effected and the oxidizing operation terminated, and continuing the blowing operation after such addition, substantially as set forth.

In testimony whereof we have signed this specification in the presence of two subscribing witnesses.

CHARLES WALRAND.
EUGENE LEGENISEL.

Witnesses:
CLYDE SHROPSHIRE,
B. DELAMOUR.